United States Patent
Chantzis et al.

(10) Patent No.: US 6,417,435 B2
(45) Date of Patent: Jul. 9, 2002

(54) AUDIO-ACOUSTIC PROFICIENCY TESTING DEVICE

(76) Inventors: Constantin B. Chantzis, 48 Pinelynn Rd., Glen Rock, NJ (US) 07452; Daniel I Rosen, P.O. Box 2963, Stateline, NV (US) 89449

(*) Notice: Subject to any disclaimer, the term of this patent is extended or adjusted under 35 U.S.C. 154(b) by 0 days.

(21) Appl. No.: 09/796,136

(22) Filed: Feb. 28, 2001

Related U.S. Application Data

(60) Provisional application No. 60/185,509, filed on Feb. 28, 2000.

(51) Int. Cl.⁷ .................................................. G09B 15/02
(52) U.S. Cl. ........................ 84/477 R; 84/600; 84/603; 84/609; 84/723
(58) Field of Search .................... 84/600–603, 609–611, 84/649–651, 723, 725, 730, 454, 470 R, 477 R, 478, 483.2, 484, 485 R

(56) References Cited

U.S. PATENT DOCUMENTS

| | | |
|---|---|---|
| 3,919,913 A | 11/1975 | Shrader |
| 4,321,853 A | 3/1982 | Tumblin |
| 5,040,447 A | 8/1991 | Murata |
| 5,183,398 A | 2/1993 | Monte et al. |
| 5,287,789 A | 2/1994 | Zimmerman |
| 5,563,358 A | 10/1996 | Zimmerman |
| 5,906,494 A * | 5/1999 | Ogawa et al. ............ 84/477 R |

* cited by examiner

*Primary Examiner*—Marlon T. Fletcher
(74) *Attorney, Agent, or Firm*—Thomas E. Workman, Jr.

(57) ABSTRACT

An audio—acoustic proficiency test method transduces, captures, measures, compares, analyzes, records, and reports on the actual performance of at least one performer's produced orderly sound sequence (pitch and rhythm). It also issues proficiency performance certificates, certified copies of the audio—acoustic performance, performance growth and statistics, or player rewards in game modes, lessons or practice scheduling and training through a transport means selected from the group of the Internet, television, and a computer network. The apparatus comprises a performer or sound generation source, transducer, central processing unit, random access memory, archival storage unit, output printer, user display and user input devices.

11 Claims, 4 Drawing Sheets

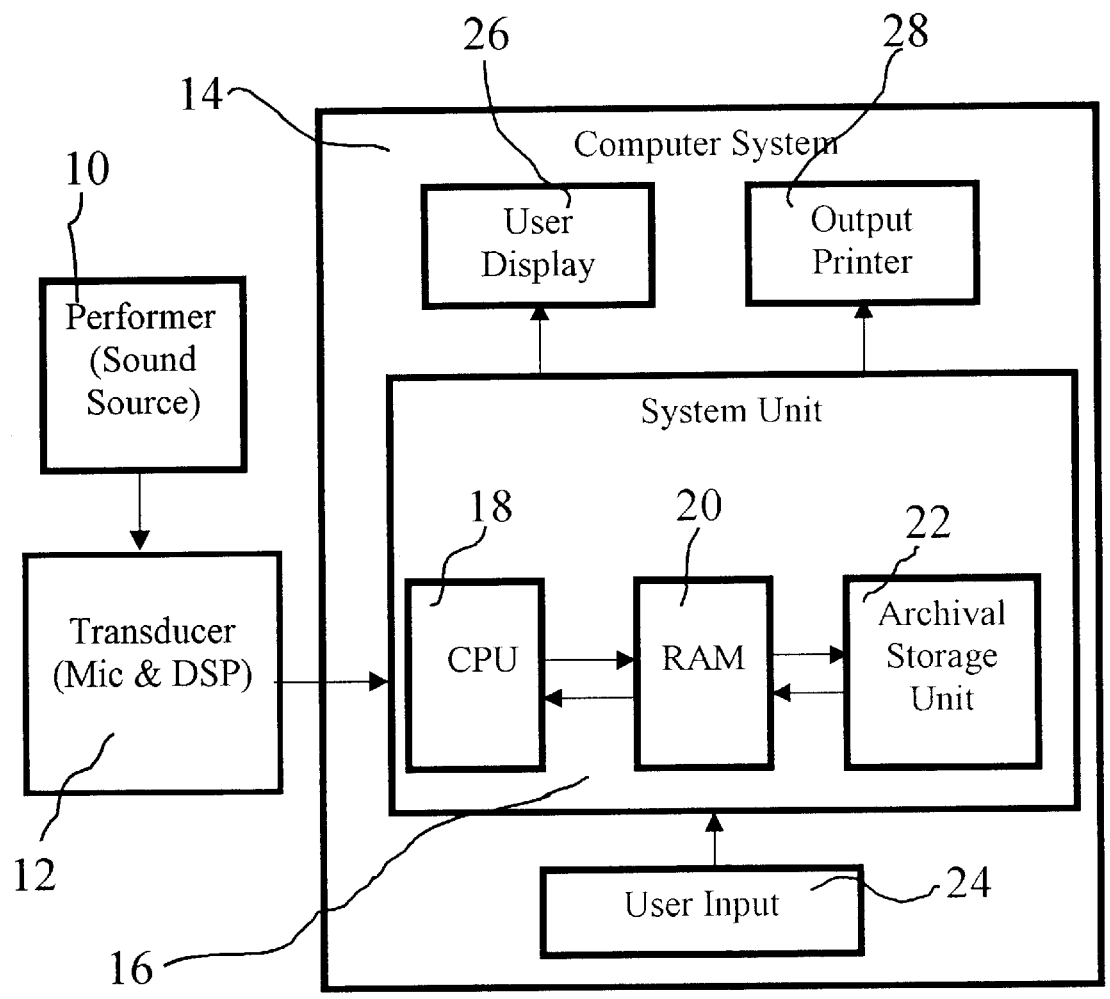
- Figure. 1.

AUDIO-ACOUSTIC PROFICIENCY TESTING DEVICE

CROSS REFERENCE TO RELATED APPLICATION

This application claims priority of provisional U.S. patent application Ser. No. 60/185,509, filed Feb. 28, 2000, entitled "Music Proficiency Testing Device", by inventors Chantzis and Rosen, which is hereby incorporated by reference for all purposes.

BACKGROUND

1. Field of the Invention

This invention relates to audio—acoustic testing devices, specifically to such devices which are used for transducing, capturing, measuring, comparing, analyzing, recording and reporting on the performance proficiency of a human, apparatus, or combination that are capable of producing an orderly sound sequence.

2. Description of Prior Art

For many years computers have been used to grade educational and other knowledge and skilled tests. The computer—based testing services market has evolved over the past ten years as a result of a recognized need to provide an easier, more secure way to deliver large—scale standardized tests. The conversion of tests from paper and pencil format to computer—based format and the continued development of certifications in technology industries are driving market growth. It is expected that the test conversion rate will accelerate now that the computer—based testing services industry has become well established and has demonstrated its capability to provide large volumes of tests with a consistently high level of service. It is also expected that the rapid evolution of new technologies will require the development of more training and certification programs in technology—based industries. The technology certification, professional licensing and certification, academic achievement, and aptitude industries continue to grow at a fast rate. Therefore, the worldwide demand for products and services to satisfy the unmet needs of this industry is expected to continue to be strong at least for the next decade.

Computer—based testing and assessment programs are often delivered through a testing center network; these provide the following advantages: a) They are more convenient, b) they test competency more accurately, c) they provide immediate scoring and results, d) they provide higher levels of security, and e) they reduce test administration costs and personnel demands.

Until now, there has never been a practical means for testing audio—acoustic performance—more specifically, music performance---against fully objective measures of proficiency. Digital technology has already resulted in other devices that in some respects anticipate or move in the direction of standardized audio—acoustic proficiency testing. However, all existing technology fails to provide any general purpose audio—acoustic proficiency tests device.

Indeed, proficiency in music has always been evaluated with reference to the performance of musical sequences of scales, arpeggios, and other musical configurations and exercises. In the history of musical pedagogy, in which the need for such evaluations becomes paramount, these evaluations have never been accomplished except by means of subjective or qualitative (as opposed to objective or quantitative) methods. In every instance, the presence of a sophisticated and sensitive musical ear is required, which is found inconveniently only on a small number of living human beings.

Mechanical means of measurement and evaluation were absolutely out of the question prior to the development of digital electronics. In addition, even the advent of these material technologies did not have sufficient strength in themselves to bring about a universal audio—acoustic proficiency test apparatus. U.S. Pat. No. 5,515,764, issued May 14, 1996 to Rosen, discloses a harmonic metronome which teaches of a means for structuring the production of metronomic sequences of musical scales, arpeggios, and other standard musical configurations and exercises.

Rosen's harmonic metronome was the first practical standard for measurement of musical pitch and rhythm in "real-time" performance contexts or practice. Therefore, it is a practice accessory (like the traditional metronome) for real musical performance and practice. However it was not able to compare and report on the actual performance of a performer's sound sequence (pitch and rhythm). Also it could not issue proficiency performance certificates, certified copies of the audio—acoustic performance, performance growth and statistics, or player rewards in game modes, lessons or practice scheduling and training. None of the marketed products or those taught by prior art which might be related in this summary (conventional metronomes of all kinds, musical tuners of all kinds, and the harmonic metronome) have been designed for generalized evaluations of audio—acoustic performance.

With this in mind, the following related technologies will be discussed computer music software, music tuners, metronomes, and particularly the harmonic metronome as it is taught by the above Rosen patent.

Computer music software has featured the use of specialized testing procedures in elementary music education. In those the student is asked to do a specific task, which is then monitored and evaluated. For example, a student may be asked to play a sequence of notes on a keyboard. If the student errs, the program highlights the error and offers a correction. This provides a useful utility for teachers of elementary musical skills. However, it focuses on the particular skills required for very particular and individual musical tasks that are individually designed for a specific pedagogical purpose at a particular point in a larger course of study. For example, a student may be required, in one particular lesson of a piano study course, to press a particular key on the piano keyboard. If the wrong key is pressed, the computer alerts the student to the error. The test is incorporated into the lesson. It is neither designed as an audio—acoustic proficiency test, per se, nor is it capable of serving as such due to its extremely limited capacity.

Production of an accurate static tone is a good start for a music student. However music is the dynamic organization of sound over time. An accomplished musician needs the following additional skills: the ability to produce a sequence of tones (playing a melody), to match a sequence of tones (playing a melody in key), to produce a tone relative to a reference tone (playing an interval), to produce a sequence of tones relative to a sequence of reference tones (playing in harmony), to produce tones in a broad range of pitches (range), quickly varying the pitch and amplitude (vibrato and tremolo), to produce tones at specific times and durations (playing in meter), and to produce tones of good timbre (tone quality).

A basic ability required of a student of music is to produce and sustain a musical tone of defined pitch and good timbre. This task is easy on an instrument like a piano which mechanically quantizes pitch and constrains timbre. A singer, however, must dynamically adjust their vocal muscles to control pitch and timbre based on their aural perceptions. Similarly, a violinist must adjust their bowing and fingering based on their aural perceptions.

In music instruction, a student's aural perceptions are typically developed through collaboration with a music teacher who points out, by verbal comment and audible example, the pitch, timbrai, and timing errors of the student. Teaching musical skills are complicated by the fact that sound, unlike paintings, cannot directly be seen and only exist when played. Audio tape recorders allow a student to review their performance, but do not provide any analysis.

A system of entertainment that offers learn—by—example instruction is the Karaoke™ system popularized in Japan. A Karaoke system (literally Japanese for 'hollow orchestra') consists of a pre-recorded audio source, a microphone, audio mixer, amplifier, and speaker. The audio source material, typically a compact or laser disk such as that sold under the trademark LaserKaraoke by Pioneer LDCA. Inc. 2265 East 22th Street Long Beach, Calif. 90810, is specially prepared with musical accompaniment on one channel and a solo vocal reference on the other. The musical accompaniment can be any musical instruments that provide tonal support for the singer. The accompaniment is usually a band or orchestra, but could simply be a piano, other vocalist, or a guitar. The reference channel is typically the solo voice of a trainer singer, or a solo instrument like a clarinet or monophonic synthesizer. The Karaoke system allows the singer to independently adjust the volume of their voice, the accompaniment, and the reference solo voice. Typically a student would practice singing with the reference solo voice and accompaniment. After they have learned the words and are comfortable singing the melody, they turn off the reference solo voice and sing, unassisted, with the accompaniment. More elaborate karaoke systems use a laser disk or CD+G compact disk (a format that encodes graphic images with audio) that display song lyrics on a video monitor which change color as each word is sung (analogous to "the bouncing ball" technique). However, Karaoke systems do not evaluate the singer's performance and hence the student must rely on their own musical perceptions for guidance.

Electronics devices exist which visually indicate the instantaneous absolute pitch and error of a tone source (e.g. Sabine ST-1000 Chromatic Auto Tuner, Korg DT-2 Digital Tuner, Arion HU 8400 Chromatic Tuner) Mercer in U.S. Pat. No. 4,273,023 (Jun. 16, 1981), discloses a device that displays the instantaneous absolute pitch of a musical instrument with an array of light emitting displays (LEDs) arranged on a musical staff but can only display the pitch of one tone source at a time. Tumblin in U.S. Pat. No. 4,321, 853 (Mar. 30, 1982) discloses a system that measures the instantaneous pitch of a musical instrument relative to an electronically generated reference tone and displays the difference (the pitch error) on a column of lights. Neither of these systems provides a time history of pitch nor do they provide any quantitative indication of timbre or amplitude.

Prior general—purpose audio—acoustic proficiency test devices were neither user—friendly nor practical in the context of a continuous performance of a wide—ranging collection of musical materials. These devices fail to test the ability of a performer to play the right keys whenever and wherever they are required by an designated musical purpose. For example, a historically traditional test required a student to play any musical scale in any one of the various series of keys and configurations that is possible within the art of keyboard playing.

Keyboard playing is only singled out here for illustrative purposes, and everything said here applies equally to playing on any instrument. The discussion thus far has focused on the ability to perform correct pitches in musical sequence. But testing devices have also failed to address another factor that enters into a proper evaluation of musical proficiency. The other factor pertains to the moment in time when a musical key is pressed or when a musical pitch is played in some other way. Prior audio—acoustic proficiency tests methods failed to integrate both of these two primary factors that are relevant to an evaluation of musical proficiency. A musician must play the correct pitches, and play them at the correct time in order to demonstrate proficiency in music performance. Music is a combination of the elements of pitch and rhythm.

Various devices have addressed the need for precise measurements of musical pitch and rhythm, leading in the direction of an audio—acoustic proficiency test method. Such devices have been produced under the descriptive category of "tuners," which either play pitches tuned to a standard of absolute pitch, or which measure the accuracy of specific musical pitches played on a musical instrument. Thus, the traditional pitch pipe or tuning fork provides a specific pitch as a reference for the musician who wants to calibrate his own pitch to that of a conventional standard accepted beforehand by the musical community. For example, 440 cycles per second has been designated for the pitch called "A" as a universally recognized international convention.

After the development of electronic technologies, it was possible not only to provide reference frequencies, but also to measure electronically the pitch produced by the musician, and even to compare it with the standard enforced by convention. Thus, many electronic tuners have been equipped with microphone inputs to deliver the electronic signal from a microphone that registers the sound produced by a musical instrument (line inputs are used for electronic instruments). The resulting signal is compared to the designated standard and the result is displayed in some sensible form.

It is important to note that tuners do not currently respond to an input consisting of programmed sequences of pitches from scales, arpeggios, and other configurations of pitch that make up the basic material of musical performance, per se. Tuners respond to single pitches as single events, measured and evaluated as such. Tuners, moverover, do not measure musical time. Tuners address a very specific and partial need to test the accuracy of specific pitches as singular events which is far from being a universal audio—acoustic proficiency test device. This function is but preparatory to musical performance, a mere matter of putting the instrument in proper tune. It has little bearing on music performance as such, which is comprised of sequences of many pitches disposed in varying rhythms of great variety.

Another related area of technology is the metronome. All standard, traditional mechanical and electronic metronomes provide a standard measure of musical time against which the musician compares own rhythmic performance. The harmonic metronome taught by Rosen, op. cit., does not have a feedback mechanism to inform a performer (test subject) about the incidence or degree to which its audio—acoustic proficiency performance deviated from a stored reference standard and comparable results from other tests subjects grouped by such profile parameters as age, years of experience and geographical location.

SUMMARY

In accordance with the present invention an audio—acoustic proficiency test method transduces, captures, measures, compares, analyzes, records, and reports on the actual performance of at least one performer's produced orderly sound sequence (pitch and rhythm). It also issues proficiency performance certificates, certified copies of the audio—acoustic performance, performance growth and statistics, or player rewards in game modes, lessons or practice scheduling and training. The apparatus comprises a performer or sound source, transducer, central processing unit, random access memory, archival storage unit, output printer, user display and user input devices.

Objects and Advantages

Accordingly one object and advantage of the current invention is to provide the first objective method for measurement and evaluation of audio—acoustic performance. It transduces, captures, measures, compares, analyzes, records, and reports on the actual performance of the performer's sound sequence (pitch and rhythm). Also it issues proficiency performance certificates, certified copies of the audio—acoustic performance, performance growth and statistics, or player rewards in game modes, lessons or practice scheduling and training. It tests the ability of a performer to play the right keys whenever and wherever they are required by any designated musical purpose by performing correct pitches in musical sequence. It integrates the elements of rhythm and pitch so a performer plays the correct pitches and plays them at the correct time. It responds to an input consisting of programmed sequences of pitches from scales, arpeggios, and other configurations of pitch that make the basic material of musical performance and it measures musical time. It provides a feedback mechanism to inform a performer about the incidence or degree to which its audio—acoustic proficiency performance deviated from a stored reference standard and comparable results from other test subjects grouped by such profile parameters as age, years of experience and geographical location. It can be used for diagnosis and treatment of a number of audio—acoustic—related deficiencies of at least one living being such has attention deficit disorder, ear training, and creativity enhancement.

In addition, it provides a universal application in the field of music, respecting the dual musical realms of rhythm and pitch simultaneously in the electronic evaluation of a musician's (or musicians') performance of any one or a combination of various sequences of musical scales, arpeggios, and other standard musical configurations. It satisfies the need for testing musical performance on any instrument (including the voice), and in any context in which evaluation plays a role, for example:

in self-study or study with a teacher,
in schools where grades based on subjective measures have heretofore resulted in much confusion, argument, and discontent,
in practical organizational procedures or ordinary performance ensembles, such as orchestras or bands where positions within the ensemble are awarded according to perceived merit (or, rather, the highly contested measurement and evaluation of said merit); and
in professional organizations, such as unions or guilds of professional musicians, where players are admitted only if they can demonstrate a certain level of practical proficiency.

DRAWING FIGURES

FIG. 1 shows a typical configuration of an audio—acoustic proficiency test apparatus components according to the invention.

Figure 2A:
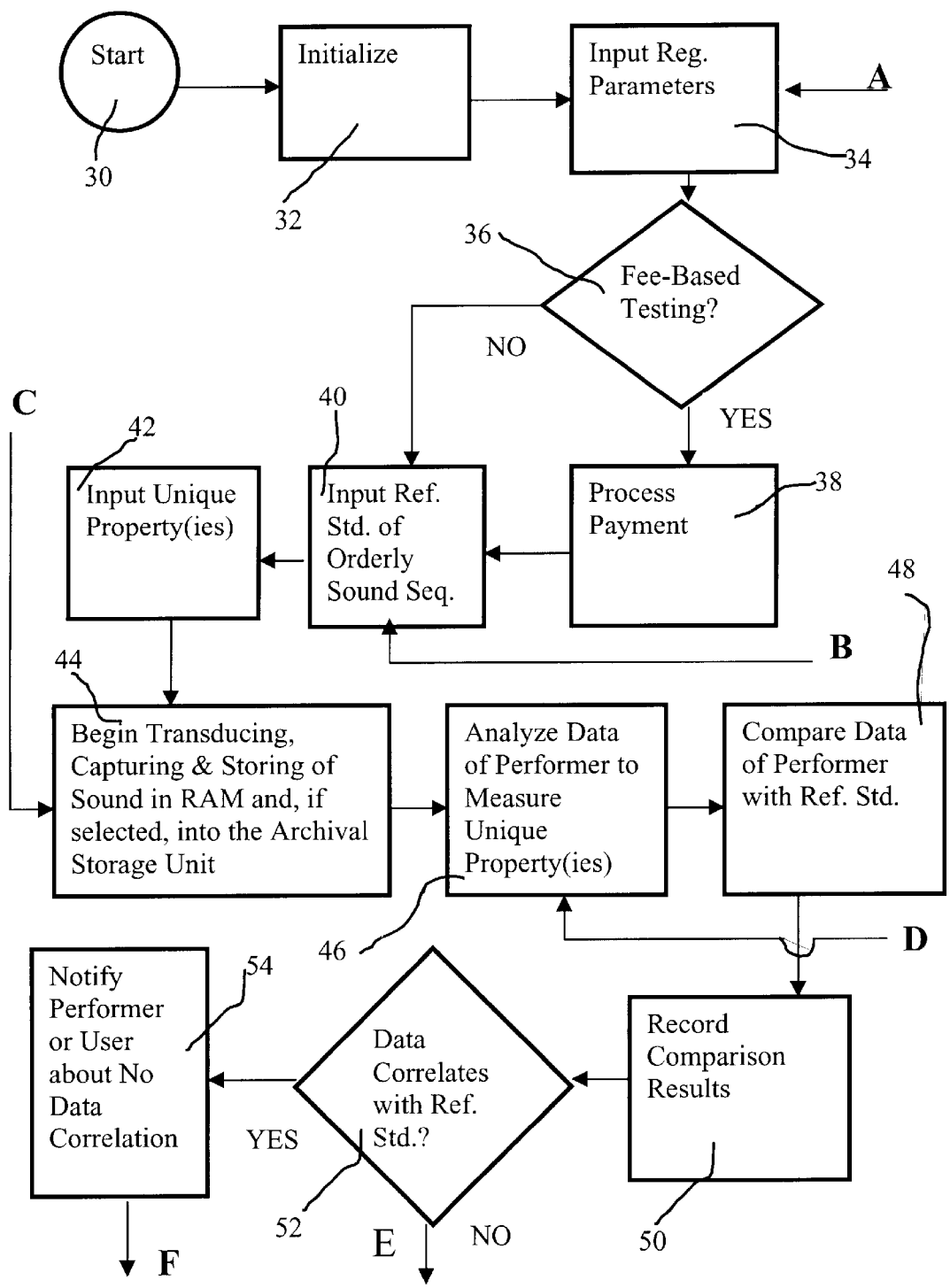
FIG. 2 shows a flowchart illustrating the operation of an audio—acoustic proficiency test apparatus.

Reference Numerals in Drawings
10 Performer (Sound Source)
12 Transducer
14 Computer System
16 System Unit
18 Central Processing Unit or CPU
20 Random Access Memory or RAM
22 Archival Storage Unit
24 User Input
26 User Display
28 Output Printer

DETAILED DESCRIPTION PREFERRED EMBODIMENT

The components of the audio—acoustic proficiency test apparatus accomplish three main objectives. These are: 1) recording or registering the performance of an audio—acoustic test, 2) evaluating it, and 3) reporting on it.

As shown in FIG. 1, a Performer 10 can be any of the following: at least one living being generating a sound, at least one natural article such as a musical instrument which is manipulated by a living being, at least one natural article which is manipulated by an engaged article such as a robot or musical instrument, at least one human—made article which is manipulated by a living being or at least one human—made article which is manipulated by an engaged article.

A Transducer or transduction system 12 includes a microphone, a Digital Signal Processor (DSP), a Sound Amplifier, Sound Compressor and Sound Filter. These are employed to gather and collect information from the musical performance of the performer being tested and transduce it to System Unit 16. The wave patterns of air pressure that are created by Performer 10 are electronically translated by a microphone into an analog audio signal that feeds directly into Transducer 12. A transducing process can be either of an analog—to—digital converter, a sound card analog—to—digital converter, a built-in analog—to—digital converter, a sampler a sampling module further comprising an analog—to—digital converter, hard disc recorders which contain analog—to—digital converters, any other form of audio conversion which transduces an audio signal to a discrete, digitized form from its continuous, analog form, and hardware and software for accessing and converting previously digitized audio of any standardized, application—specific, digital audio format into a program—usable form. This transduction comprises amplification, filtering and compression technologies which are known to one knowledgeable in this art.

The microphone (not shown) in Transducer 12 does not represent the only form in which information about the perfomer's performance may be taken into the apparatus. In fact, the word "information" is used here in the broader sense that encompasses an analog audio signal from a microphone or the output of an electronic instrument. Digital forms (and all other mechanical and/or electronic means of generating the input of information to the system) may be used. For example, a typical Musical Instrument Digital Interface (MIDI)—capable keyboard or other electronic instrument may transfer the information by means of MIDI, and without the use of a microphone.

Computer System 14 is comprised of System Unit 16, User Input 24, User Display 26, and Output Printer 28. System Unit 16 is comprised of Central Processing Unit (CPU) 18, a Random Access Memory (RAM) 20, and an Archival Storage Unit 22. Computer System 14 interfaces with Transducer 12 to transduce, capture, measure, compare, analyze, record, and report on the actual performance of at least on performer's produced orderly sound sequence (pitch and rhythm) by Performer 10. It also can issue proficiency performance certificates, certified copies of the audio—acoustic performance, performance growth and statistics, or player rewards in game modes, lessons or practice scheduling and training.

As indicated, the sound of the musical performance is translated into an electrical analog audio signal by means of a microphone. Transducer 12, functioning as a typical analog—to—digital converter, converts this analog signal into a digital signal, creating digital information which is sent to and stored in RAM 20 via CPU 18. In this way, Transducer 12 translates the shape of the electronic signal from a microphone into a form of digital information that can be read and evaluated by CPU 18, which performs the second function of the device. The information in RAM 20 reflects the shape of the analog signal received by Transducer 12 after its conversion into a corresponding digital signal. CPU 18, under control of a program on a disc or in a PROM (not shown), analyzes at least one unique property of at least one segment of at least one orderly sound sequence which is produced by at least one performer of that digital signal. This unique property is either pitch, rhythm, a frequency waveform, an amplitude waveform, timbre, duration, position, velocity, acceleration or time. For example, the frequencies correspond to musical pitches played in the performance, and the amplitude peaks correspond to the point in time when those pitches were heard. U.S. Pat. No. 4,201,105, issued May 6, 1980 to Alles, U.S. Pat. No. 4,196,650, issued Apr. 8, 1980 to Fricke et. al., U.S. Pat. No. 4,193,332, issued Mar. 18, 1980 to Richardson, U.S. Pat. No. 4,178,822, issued Dec. 19, 1979 to Alonso, and U.S. Pat. No. 4,177,706, issued Dec. 11, 1979 to Greenberger, all describe alternative methods for analyzing an audio signal, including frequency and amplitude characteristics which are technologies known to one versed in this art.

The specific algorithm to be utilized for the analysis of the digitized data is dependant on each parameter to be measured. For example, the pitch of a note can be measured by performing a Fast Fourier Transform (FFT) analysis for the duration of the note. The measured frequency components can then be compared to the universally accepted frequency of the reference note (e.g., "A"=440 Hertz).

An example of an orderly sound sequence is a music song. An example of a segment of an orderly sound sequence is two notes. CPU 18 compares the resulting information with standardized information stored in RAM 20, reflecting the frequencies and amplitudes that result from a performance that is perfect with respect to pitch and rhythm. On the basis of this comparison, CPU 18 generates a report according to its internal programming, which is sent to Output Printer 28, stored in Archival Storage Unit 22, or transported to another computer via the Internet or any other suitable data handling and output device.

Figure 2B:
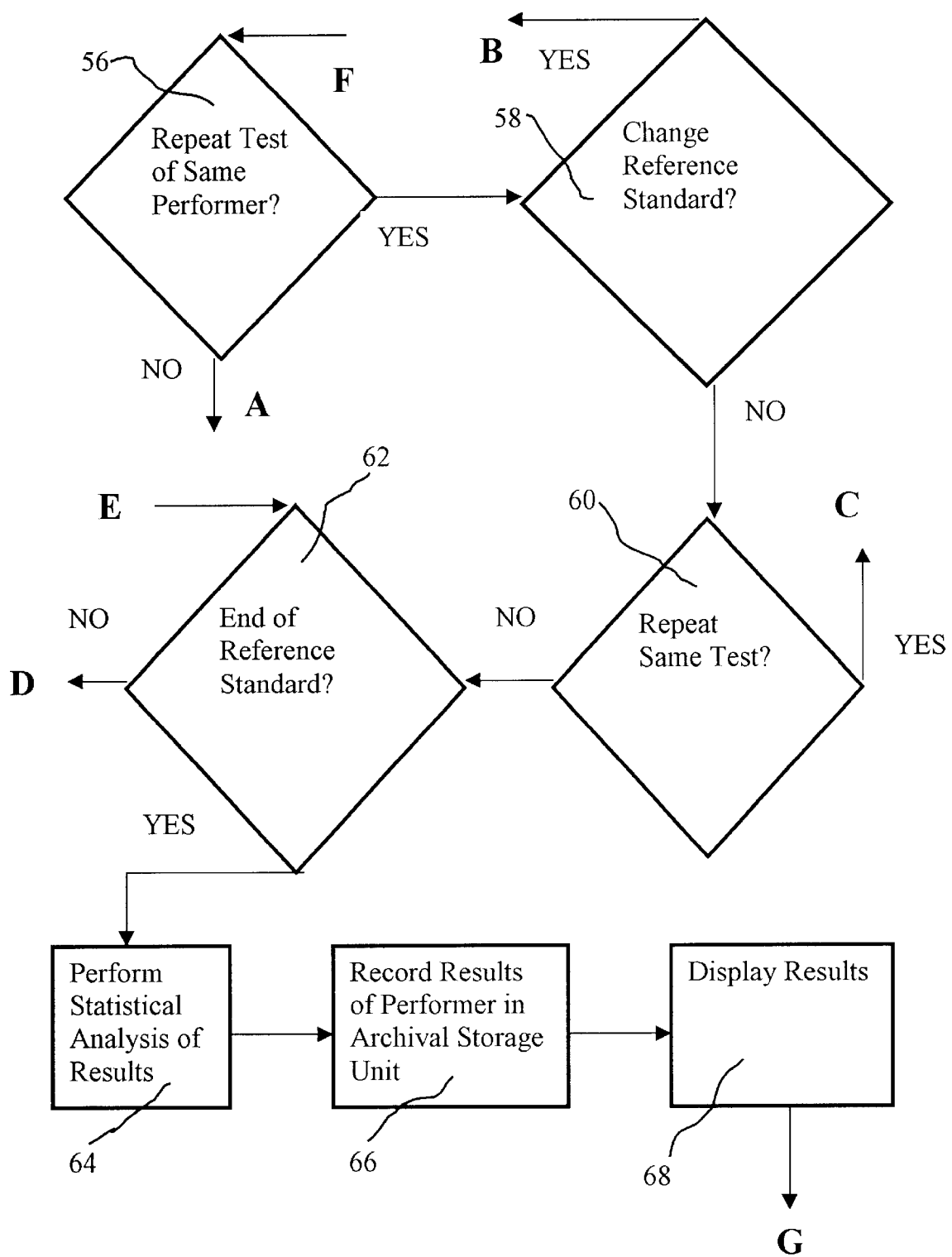
Figure 2C:
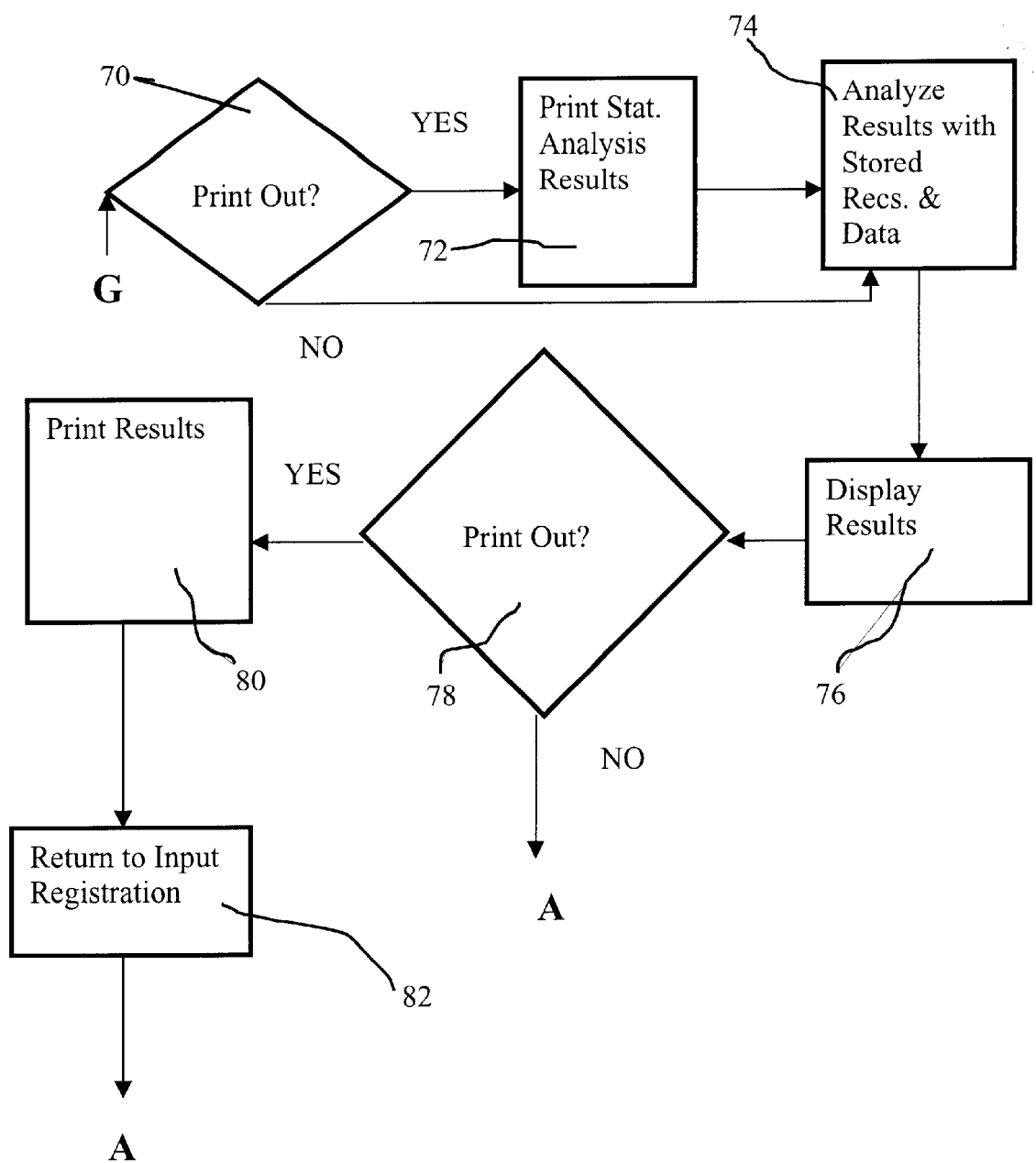

A User is anyone who either inputs registration information, or interacts with the computer system during the audio—acoustic test. The user interacts with apparatus through User Input 24, which can be, for example a keyboard (not shown) or mouse (not shown) and User Display 26. For example User Display 26 can be a monitor or television screen. A performer is one or more humans optionally accompanied by instruments that produce an audio acoustic signal. A performer can also be User. A flowchart for the internal program in CPU 18 is shown in FIG. 2 and discussed below in text format.

30 Start
32 Initialize (hardware, memory variable, etc, as required)
34 Input registration parameters to identify performer and, if applicable, test administrator, age of performer, expected proficiency level, etc.
36 If not fee-based testing skip to step 40
38 Process payment (e.g., debit account)
40 Input selection of reference standard orderly sound sequence (e.g., scale, etude)
42 Input selection of unique property(ies) to evaluate (e.g., pitch, rhythm) or default to selection stored in Archival Storage Unit
44 Begin transducing, capturing and storing performer's digitized sound signal into RAM buffer and if selected, into the Archival Storage Unit
46 Analyze stored, digitized data of performer to measure the properties selected in step 42
48 Compare analyzed data of performer with data of reference standard for the measured property(ies) as selected in step 42
50 Record comparison results of step 48
52 If data can be correlated to reference standard skip to step 62
54 Notify User and/or performer of inability to correlate data to reference standard
56 Repeat test of same performer? Yes, continue; No, go to step 34
58 Change reference standard? Yes, go to step 40; No, continue
60 Repeat same test? Yes, go to step 44; No, continue
62 If not end of reference standard, go to step 46
64 Perform statistical analysis of step 50 results
66 Record ID of performer, results of step 64, data and time in Archival Storage Unit
68 Display results of step 64
70 If no printout, skip to step 74
72 Print results of step 64
74 Analyze results of step 64 with respect to stored recommendations and data
76 Display results of step 74
78 If no printout, return to step 34
80 Print results of step 74
82 Return to step 34

The printing of a report fulfills the third and final function of the device. However, once again, a printer is not the only means for output of the report from CPU 18. A video monitor is an example of an equally practical means for display of the report. Of course, multiple outputs may also be employed, including video, audio, and printed results.

The report details the incidence and degree to which the information from a musician's performance deviates from the information stored in memory. Naturally, the report may be extended to any level of analysis, showing, for example, comparable results from other test subjects according to the age of the performer, years of study, the setting of the performance, etc. Recommendations for improvement may be included. Any and all responses to the evaluation of the performance may be considered as within the scope of the report generated by CPU 18.

Operation—FIG. 1

The audio—acoustic proficiency test apparatus may be used in a great variety of places and situations, privately or professionally, in the course of formal study, or in many other ways as the context requires. The apparatus of FIG. 1 is configured to a predetermined schedule of musical scales, arpeggios, and other similar exercises. This configuration is done completely in accordance with the wishes of the person taking and/or giving the test, any may be set within a nearly infinite range of possibilities.

In order to configure the apparatus for a specific test, the performer or proficiency test center processes the necessary information by communicating with User Display 26 and User Input 24 of FIG. 1.

A person then simply positions themself within the range of Transducer 12, and plays the predetermined schedule of scales, and/or arpeggios, and/or other musical exercises or configurations to which the apparatus has been configured. Alternatively, the performer or sound source can be in the form of a CD or stored data file.

The apparatus does not test absolutely "anything" that the performer may choose to play Rather it compares the performer's performance of a specific sequence of rhythms and pitches (or combination of sequences) against the objective standard of a perfectly accurate (i.e., perfectly timed and tuned) performance of that same sequence. Therefore, the apparatus must be set for the sequence that is to be played. However, this requirement is not a limitation, since the apparatus may be configured in any manner.

The apparatus depends upon the use of pre established and standardized sequences of musical rhythms and pitches (i.e. scales, and/or arpeggios, and/or any other standardized musical exercises and configurations) to accomplish this objective, and in a manner similar to that employed by the harmonic metronome.

The user interface of the apparatus is very similar to that of the harmonic metronome, and thus of proven simplicity and ease of use: No MIDI or other technical knowledge is required Test sequences are easily configured out of pre programmed collections of conventional scales, and exercises, and, set according to such conventional performance parameters as key, meter, and tempo, as desired.

The MODE page allows the user to select between two specific options. Scales and Arpeggios, and Exercises. Only one option is highlighted on User Display 26 at any time. A data slider like an arrow key or mouse are used to move highlight between the two options, and an ENTER button like the one on a typical keyboard is used to select one of the options.

When the Scales and Arpeggios option is highlighted and the ENTER button is pressed, User Display 26 displays the SCALES AND ARPEGGIOS page. This page contains a list of all the possible musical scales and arpeggios that are available for testing by the system. Preferably the following options are listed:

Major Scale, Major Arpeggio
Lydian Scale, Lydian Arpeggio
Lydian Augmented Scale, Lydian Augmented Arpeggio
Augmented Scale, Augmented Arpeggio
Harmonic Major Scale, Harmonic Major Arpeggio
Major Pentatonic Scale, Major Pentatonic Arpeggio
Diminished Scale, Diminished Arpeggio
Dorian Scale, Dorian Arpeggio
Natural Minor Scale, Natural Minor Arpeggio
Harmonic Minor Scale, Harmonic Minor Arpeggio When the SCALES AND ARPEGGIOS page first appears, the first item on the list is highlighted A DATA ENTRY slider—like a mouse or arrow keys—is used for scrolling the highlight through the list of options, and the SELECT button—like the Enter key in a typical keyboard—is used to select the desired option from the list. SELECT may be pressed for any number of options. When more than one option is selected, the various scales and/or arpeggios are combined into a continuous sequence.

Upon pressing the ENTER button, the OCTAVE page appears on User Display 26. This page displays the following list of options:
1 octave
2 octaves
3 octaves
4 octaves When the OCTAVE page appears, the first item in the list is highlighted. Again, using SELECT Button and/or DATA ENTRY slider, the user selects the desired option from the list.

After pressing the ENTER button once again, the KEY page appears on User Display 26. Using the above—described method, the user may select a different tonal center or key from the KEY page, which displays the following list of options:
C
C-sharp
D
D-sharp
E, etc. through B.

When the ENTER button is pressed, the following TEMPO page appears on User Display 26.
20 bpm (beats per minute)
25 bpm
30 bpm
35 bpm
40 bpm
45 bpm
50 bpm, etc. through 240 bpm In the above—described manner, pressing the SELECT Button and/or the DATA ENTRY slider, the User makes a selection from the TEMPO page. After pressing ENTER button, the following METER page appears on the LCD screen.
2/2, 2/4, 2/8
3/2, 3/4, 3/8
4/2, 4/4, 4/8
6/4, 6/8, 9/8

Finally, after selecting an option on the METER page, the User presses ENTER button again, and the following LOOP page appears on User Display 26:
No repeat
Repeat once
repeat two times
repeat three times, etc. through repeat ten times A LOOP page allows the user to program a schedule of repetitions for the previously selected exercise. Specifically, after the user selects, for example, the Lydian scale, in four octaves, in the key of B-flat, at a tempo of 70 beats per minute, the User may then also choose the repeat two times option on the LOOP page. In this way, the audio—acoustic proficiency test apparatus is configured for a test in which the Lydian scale is to be played twice, in four octaves, in B-flat, at 70 bpm.

The audio—acoustic proficiency test apparatus is ready for use after pressing the TEST button. A performer is stationed in front of Transducer 12, and is asked to play the same sequence of scales and/or arpeggios that have just been selected for the test in the manner described above. If desired, the Metronome Switch is turned ON, so that the performer may have a reference beat to play along with. If composite rhythms or meters are included in the test, and the metronome is used, then the performer must play in even closer syncronism with the metronome. Therefore, the performer is directed to begin playing after a number of preparatory beats (for example 1, 2, 4, 8, etc.) These preparatory beats are provided by the metronome at the beginning of the test when the Metronome Switch is moved from OFF to ON.

Alternatively, and in a manner analogous to that described above, a great variety of standard musical exercises may be selected for testing by selecting the Exercises option MODE page.

The operation of the audio—acoustic proficiency test apparatus is correspondingly simple and direct. Having configured it for the test, and after pressing the Test button, the musician(s) may begin playing at any time, or as deemed appropriate by the person giving the test. A typical test result will include the following information:

1. Identification data of the person that took the test.
2. Identification data of the instrument that was tested, if any.
3. Identification data of the test center and/or individual where the test took place.
4. The incidence or degree to which the person's audio—acoustic proficiency performance deviated from a stored reference standard according to such specific but relative parameters as a person's age, proficiency level, years of study, comparable results from other test subjects, the setting of the performance.
5. Recommendations for improvements.
6. Rewards.

Conclusions, Ramifications, and Scope

Accordingly, the reader will see that the audio—acoustic proficiency apparatus satisfies an unmet need of the audio—acoustic user, school, trainer, employer of said users for a quantitative and user—friendly, proficiency test. It provides a unique and unprecedented solution for use in the testing and evaluation of audio—acoustic performance proficiency. It fulfills a need for objective evaluation in a field where subjective evaluations have heretofore been the norm. It greatly simplifies the task of clearly defining the standards of musical proficiency, as its use will accrue a history of usage that will demonstrate the capabilities of the human physical control of musical instrumentalities in detailed, quantitative and qualitative terms. In this way, it provides an accessory and tool in educational, professional, and amateur contexts everywhere that music is played and practiced. It is also suitable for the diagnosis and treatment of a number of audio—acoustic—related deficiencies of at least one living being, such as attention deficit disorder, ear training, and creativity enhancement.

While the descriptions above contain many specifics, these should not be construed as limitations on the scope of the invention, but rather as an exemplification of one preferred embodiment thereof. Accordingly, the scope of the invention should be determined not by the embodiment illustrated, but by the appended claims and their legal equivalents.

We claim:

1. An audio—acoustic proficiency test method, comprising:
   (a) initializing a testing operation, operating a software,
   (b) inputting a plurality of registration parameters selected from a group comprising an identification of a performer and a test administrator, the age of performer, the experience of performer, the expected proficiency level, and a payment,
   (c) inputting a selection of at least one reference standard, selected from a group comprising an orderly sound sequence and a plurality of notes, said reference standard or reference standards selected from a group comprising a performer—selected musical scale, a performer—selected arpeggio, a performer—selected sequence of musical scales, a performer—selected sequence of arpeggios, a performer—selected set of at least one pre-programmed musical etude, and a performer—selected set of at least one pre-programmed musical exercise,
   (d) transducing at least one unique property of at least one segment of at least one performer's orderly sound sequence, said transducing selected from the group comprising amplification, filtering, and compression, thereby to provide a transduced unique property, said unique property selected from a group comprising pitch, rhythm, frequency waveform, amplitude waveform, timbre, duration, position, velocity, acceleration and time, and said segment comprising a plurality of notes,
   (e) capturing said transduced unique property of said segment of said orderly sound sequence,
   (f) storing at least one unique property of said segment of said transduced, orderly produced sound sequence,
   (g) analyzing said stored unique property of said segment of said performer's orderly sound sequence, said analyzing comprising measuring said stored unique property of said segment of said performer's orderly sound sequence,
   (h) comparing said unique property of said segment of said performer's orderly sound sequence with at least one unique property of at least one segment of at least one stored reference standard orderly sound sequence,
   (i) recording at least one comparison result from said comparing,
   (j) performing a statistical analysis of said comparison result for performer's audio—acoustic proficiency performance according to at least one level of proficiency, said audio—acoustic performance comprising at least one segment of said orderly sound sequence, and
   (k) storing at least one unique property of said performer's audio—acoustic proficiency performance, said storing selected from a group comprising confidentially storing at least one performer's test performance history records, test scores and earned performer rewards, earned performer points, and confidentially storing at least one performer's related test performance history records in database, said test performance selected from the group comprising duration of practice, established practice—playing patterns, date, time, day, solo and group practicing for subsequent detailed statistical analysis, interpretation, and advice.

2. The audio—acoustic proficiency test method of claim 1, wherein a output process is managed by at least one proficiency test center, said managing being arranged to perform a task which is selected from the group comprising a recorded output, a written output, a visual output display, an audio output, and a combination of either written or visual or audio outputs, said recorded output further comprising a device, media, or file format selected from a group comprising compact disks, MIDI files, wav files, mp3 files, hard drives, zipped drives, tape back-ups and floppy disks.

3. The audio—acoustic proficiency test method of claim 1 wherein said output operation is selected from a group comprising reporting on at least one unique property of at least one performer's audio—acoustic proficiency performance, reporting on at least one performer's audio—acoustic growth on at least one unique property of performance, reporting on at least one performer's audio—acoustic proficiency history for at least one unique property of performance, issuing at least one copy for at least one unique property of said performer's audio—acoustic proficiency performance, issuing at least one performer certificate for at least one unique property of said performer's audio—acoustic proficiency performance, issuing certificate copies to others than at least one performer for at least one unique property of said performer's audio—acoustic proficiency performance, providing at least one performer reward in game mode for at least one unique property of said performer's audio—acoustic proficiency performance, providing at least one performer reward in game mode for at least one unique property of said performer's audio—acoustic proficiency performance, providing at least one performer reward in lesson mode for at least one unique property of said performer's audio—acoustic proficiency performance, providing at least one performer reward in practice scheduling mode for at least one unique property of said performer's audio—acoustic proficiency performance and providing at least one performer reward in training mode for at least one unique property of said performer's audio—acoustic proficiency performance, and, wherein an output is selected from a group comprising a recorded output, a written output, a visual output display, an audio output and a combination of either written or visual or audio outputs, said recorded output further comprising compact disks (CDs), MIDI files, hard drives, zipped drives, tape back-ups and floppy disks.

4. The audio—acoustic proficiency test method of claim 1 wherein said transducing process is selected from a group comprising analog to digital converting means, sound card analog to digital converting means, built-in analog to digital converting means, sampler, sampling module means further comprising analog to digital converting means, hard disc recorders which contain analog—to—digital converters, any other form of audio conversion which transduces an audio signal to a discrete, digitized form from its continuous, analog form, and hardware and software means for accessing and converting previously digitized audio of any standardized, application—specific, digital audio format into a program—useable form.

5. The audio—acoustic proficiency test method of claim 1 wherein step (j) further comprises selecting at least one statistical parameter that at least one unique property of at least one segment of at least one orderly sound sequence which is produced by at least one performer will be statistically analyzed, said statistical parameter being selected from a group comprising a standard deviation, a multiple of standard deviations, a range, a coefficient of variation, arithmetic mean, median, geometric mean, quadratic mean, harmonic mean, coefficient of contingency, biserial coefficient of correlation, mean deviation, coefficient of correlation, coefficient of rank correlation, multiple correlation coefficient, partial correlation coefficient, proportion, percentage, cosine squared weighing function, Kaiser-Bessel function, Gaussian (Poisson) function, Hanning function, coefficient of regression, regression equation intercept and coefficient of multiple regression.

6. The audio—acoustic proficiency test method of claim 1 wherein step (i) further comprises:
(a) advising said performer to take corrective action when said recording documents at least one discrepancy of at least one unique property of at least one segment of said transduce, orderly sound sequence;
(b) advising said performer to take corrective action when said recording documents that said performer's performance has fallen below a pre-determined proficiency level; and
(c) providing said performer with at least one recommended correction action selected from the group comprising:
  (i) taking a break for a specific time,
  (ii) repeating an exercise while listening to the correct way to perform it from the database,
  (iii) comprehending a certain subject,
  (iv) suggesting possible root causes for the performer's performed error, and
  (v) prescribing a specific practice routine.

7. An audio—acoustic proficiency test method as in claim 1, wherein the test method has four modes of operation: standard, training, game, and practice, said standard mode describing the operation of the method as originally contemplated, said training mode describing the operation of the method as it trains the performer to produce the sequence of notes that is to be tested, said gaming mode offering a user interface that captivates the attention of those with short attention spans, and said practice mode providing the performer with an opportunity to practice the performance before the performer is evaluated.

8. A method of analyzing a musician's performance, comprising:
(a) providing a musical passage comparator for comparing a test version of a musical passage in a test storage area with a standard version of said musical passage in a programmable musical passage storage area and for providing an analysis of such comparison,
(b) providing a programmable musical passage storage area and a test storage area,
(c) storing a standard version of a predetermined musical passage in said programmable musical passage storage area,
(d) playing said musical passage to provide a test version of said predetermined musical passage and storing said test version of said predetermined musical passage in said test storage area,
(e) causing said comparator to compare said test version with said standard version of said predetermined musical passage and provide a qualitative or quantitative analysis, and
(f) providing said analysis in a format selected from a group comprising video, audio, printed and electronic archiving outputs,
(g) said analysis provided in either a qualitative or quantitative format, with said analysis directed toward one or more of the following: pitch, rhythm, a frequency waveform, an amplitude waveform, timbre, duration, position, velocity, acceleration or time.

9. An audio—acoustic proficiency test method, comprising:
(a) transducing at least one unique property of at least one segment of at least one orderly sound sequence, said transducing selected from a group comprising amplification, filtering and compression, thereby to provide a transduced unique property, said unique property selected from the group comprising pitch, rhythm, frequency waveform, amplitude waveform, timbre, duration, position, velocity, acceleration and time, said segment selected from a plurality of notes, and said orderly sound sequence selected from a group comprising a performer—selected musical scale, a performer—selected arpeggio, a perfomer—selected sequence of musical scales, a performer—selected sequence of arpeggios, a performer—selected set of at least on pre-programmed musical etude and a performer—selected set of at least one pre-programmed musical exercise, (b) capturing said transduced unique property of said segment of said orderly sound sequence, said transduced unique property calculated by a process selected from the group comprising amplification, filtering, and compression.

(c) storing at least one unique property of said segment of said transduced, orderly produced sound sequence, (d) analyzing said stored unique property of said segment of said performer's orderly sound sequence, said analyzing selected from a group comprising measuring said stored unique property of said segment of said performer's orderly sound sequence, (e) comparing said unique property of said segment of said performer's orderly sound sequence with at least one unique property of at least one segment of at least one stored reference standard orderly sound sequence, (f) recording at least one comparison result from said comparing, (g) performing a statistical analysis of said comparison result for said performer's audio—acoustic proficiency performance according to at least one level of proficiency, said audio—acoustic performance comprising at least one segment of said orderly sound sequence, and (h) storing at least one unique property of said performer's audio—acoustic proficiency performance, said storing selected from the group comprising confidentially storing at least one performer's test performance history records, said records comprising test scores, earned performer rewards, and earned performer points, and confidentially storing at least one performer's related test performance history records in database, said test performance history comprising duration of practice, typical practice playing patterns, data, time, day, solo and group practicing for subsequent detailed statistical analysis, interpretation and advice.

10. An apparatus of analyzing a musician's performance, comprising:

(a) a musical passage comparator for comparing a test version of a musical passage in a test storage area with a standard version of said musical passage in a programmable musical passage storage area and for providing an analysis of such comparison, (b) a programmable musical passage storage area and a test storage area, (c) a storing manager for storing a standard version of a predetermined musical passage in said programmable musical passage storage area, (d) a player for playing said musical passage to provide a test version of said predetermined musical passage and storing said test version of said predetermined musical passage in said test storage area, said player being either a device capable of reproducing said musical passage as it was previously recorded, or said player being a human performer of said musical passage, (e) an evaluator causing said comparator to compare said test version with said standard version of said predetermined musical passage and provide a qualitative analysis, and (f) an output for providing said analysis in a format selected from a group comprising video, audio, printed and electronic archiving outputs, (g) said analysis provided in either a qualitative or quantitative format, with said analysis directed toward one or more of the following: pitch, rhythm, a frequency waveform, an amplitude waveform, timbre, duration, position, velocity, acceleration or time.

11. An audio—acoustic proficiency test apparatus, comprising:

(a) an input manager for selecting at least one reference standard, orderly sound sequence, and at least one unique property to be measured, (b) a transducer for transducing at least one unique property of at least one segment of at least one orderly sound sequence, the function of said transducer selected from a group comprising amplification, filtering, and compression, thereby to provide a transduced unique property, (c) a capturing manager for capturing said transduced unique property of said segment of said orderly sound sequence, said capturing device selected from a group comprising amplification, filtering, and compression, (d) an analyzer for measuring said unique property of said segment of said segment of said transduced, orderly produced sound sequence, (e) a comparator for comparing at least one measured unique property of at least one segment of said transduced, orderly produced sound sequence of at least one performer with said unique property of said segment of said stored reference standard orderly sound sequence, (f) a first storage for documenting and storing at least one comparison result from said comparator, (g) a statistical analyzer for analyzing the recorded results in first storage of at least one performer's audio—acoustic proficiency performance according to at least one level of proficiency, said audio—acoustic performance comprising at least one segment of said orderly sound sequence, and (h) a second storage for storing at least one unique property of said performer's audio—acoustic proficiency performance, said second data storage selected from a group comprising confidentially storing at least one performer's test performance history records, said test performance history comprising test scores, earned performer rewards, and earned performer points, and confidentially storing at least one performer's related test performance history records in a database, said performance history comprising duration of practice, typical practice playing patterns, date, time, day, solo and group practicing for subsequent detailed statistical analysis, interpretation and advice.

* * * * *